United States Patent [19]

Hagan et al.

[11] Patent Number: 4,729,579
[45] Date of Patent: * Mar. 8, 1988

[54] AXLE LIFT MECHANISM WITH SPRING CUP WEAR PLATE

[75] Inventors: Lyle M. Hagan, North Muskegon; William C. Pierce, Muskegon, both of Mich.

[73] Assignee: Lear Siegler, Inc., Santa Monica, Calif.

[ * ] Notice: The portion of the term of this patent subsequent to Jan. 6, 2004 has been disclaimed.

[21] Appl. No.: 847,724

[22] Filed: Apr. 3, 1986

Related U.S. Application Data

[63] Continuation-in-part of Ser. No. 627,414, Jul. 3, 1984, Pat. No. 4,634,141.

[51] Int. Cl.⁴ .............................................. B60G 11/56
[52] U.S. Cl. ..................................... 280/704; 384/42
[58] Field of Search ................ 280/704; 267/166, 167, 267/170, 179; 384/41, 42, 908

[56] References Cited

U.S. PATENT DOCUMENTS

| | | | |
|---|---|---|---|
| 3,151,857 | 10/1964 | Falkenberg | 267/179 |
| 3,771,812 | 11/1973 | Pierce et al. | 280/704 |
| 3,885,837 | 5/1975 | Mellor | 384/42 |
| 4,111,407 | 9/1978 | Stager | 267/166 |
| 4,634,141 | 1/1987 | Hagan et al. | 280/704 |

*Primary Examiner*—Ross Weaver
*Attorney, Agent, or Firm*—Varnum, Riddering, Schmidt & Howlett

[57] ABSTRACT

An axle lift mechanism for use in a vehicle having a suspension system which is mounted to the vehicle for movement between a load-bearing and nonload-bearing relationship. The lift mechanism has a toggle linkage pivotably coupled to the frame and to the suspension system for movement of the axle between load-bearing and nonload-bearing positions. The toggle linkage is biased to the nonload-bearing position through a compression coil spring which is mounted in a housing and is received within a spring cup within the housing. A wear plate, preferably made of a lubricating plastic material, is mounted on the spring cup between the wear plate and the housing to avoid wear between the housing wall and spring cup. The coil spring is tapered between one end which bears against an end of the housing and the spring cup end so that the coil spring does not rub against the housing wall during oscillation of the spring. The toggle mechanism can include a conventional rigid rod or a flexible strap which is mounted coaxially within the coil spring.

17 Claims, 7 Drawing Figures

AXLE LIFT MECHANISM WITH SPRING CUP WEAR PLATE

CROSS-REFERENCE TO RELATED APPLICATIONS

This application is a continuation-in-part to U.S. patent application Ser. No. 627,414 filed July 3, 1984 now U.S. Pat. No. 4,634,141.

TECHNICAL FIELD

The invention relates to axle lift mechanisms for load-carrying vehicles and, more particularly, to lift mechanisms for raising an axle/wheel assembly so as to disengage the wheels from a ground surface.

BACKGROUND ART

Several types of vehicles, including semi-trailer truck vehicles and the like, have multiple sets of axle/wheel suspension assemblies arranged in tandem so as to adequately support relatively heavy loads. To adjust the load support provided by these tandem assemblies, it is known to employ suspension systems utilizing adjustably pressurized air springs.

When the vehicle is carrying a relatively light load, it is desirable to relieve the load transmitting relationship between the vehicle and one or more of the tandem axle/wheel assemblies, and also to disengage the axle/wheel assembly from ground contact so as to reduce tire wear. To relieve load support when an air suspension system is employed, air pressure can be reduced. To achieve disengagement of the tires from the ground surface, devices commonly referred to as axle lift mechanisms can be employed. Prior lift mechanisms utilized stressed mechanical springs acting directly between a vehicle frame and the axle. When the downward load forces exerted on the axle by the suspension system were relieved, such as through deflation of air springs, lifting forces exerted by the mechanical springs pulled the axle upwardly to a raised position.

The foregoing type of lift mechanism has several disadvantages. For example, with the axle in a raised position, sufficient spring force must be maintained to support the axle and various components of the suspension system. Correspondingly, the substantially increased spring force when the axle is in the lowered position comprises preload forces on the suspension system, thereby reducing the actual maximum vehicle payload carried by the suspension system.

A type of known axle lifting mechanism is depicted as lift mechanism 60 shown in FIG. 1. Lift mechanism 60 is used with a trailing arm 62 pivotably mounted at one end to a bracket 66 through pivot connection 64. Bracket 66 is rigidly secured to a support frame 68 of a load-carrying vehicle. Although not shown in FIG. 1, the trailing arm 62 can also be connected to a vehicle axle and releasably coupled in a load supporting relationship to vehicle frame 68 through an air suspension system in a manner well known to those in the vehicle suspension trade.

The lift mechanism 60 includes a lever arm 70 having its lower end coupled to the vehicle frame 68 through a pivot connection 72. A rigid forged bar 74 is pivotably coupled at one end to a top portion of the lever arm 70 in an over-center arrangement through pivot connection 75. An opposing end of forged bar 74 is received through an aperture of a spring cup 76 and secured thereto with nut 78, washer 80 and bushing 82.

The spring cup 76 and forged bar 74 are mounted within a tubular housing 84. A compression spring 86 is also linearly mounted within the housing 84. One end of spring 86 bears against spring cup 76, while the other end of spring 86 bears against a stationary lip 77 of housing 84. Forces exerted on forged bar 74 by spring 86 can be varied by adjusting the axial location of threaded nut 78 along bar 74.

Also coupled to lever arm 70 and forged bar 74 at the pivot connection 75 is a bar link 90. The bar link 90 is correspondingly connected to a clevis link 92 and lifting chain 98 comprising a series of links 94. The lifting chain 98 is connected at its lower end to the trailing arm 62 through anchor 96.

The operation of the axle lift mechanism 60 is as follows: With the air spring (not shown) in a deflated state, the lift mechanism 60 will operate to lift the trailing arm 62 and interconnected axle and wheels. The lifting force is provided by forces exerted by the compression spring 86 bearing against spring cup 76. The forces exerted on spring cup 76 are translated through the forged bar 74 to rotate the lever arm 70 through pivot connection 72 to the position illustrated in FIG. 1. Rotation of lever arm 70 correspondingly exerts lifting forces on trailing arm 62 through bar link 90, clevis link 92 and lifting chain 98.

In the raised position, the lever arm 70 and other components of lift mechanism 60 will have the relative positions shown in FIG. 1. When the air spring is adequately inflated, forces exerted thereby on the trailing arm 62 overcome the forces exerted by compression spring 86, and the trailing arm 62 moves to a lowered position, thereby rotating the lever arm 70. As the lever arm 70 pivots in a clockwise direction as viewed in FIG. 1, the lever-type mechanical "lifting advantage" is decreased. That is, although the forces exerted by the compression spring 86 increase as lever arm 70 pivots, the lifting forces on trailing arm 62 will not substantially increase.

In normal use of the suspension the rotation of the trailing arm 76, whether by lifting or lowering the axle, or by oscillation due to road vibration, the spring cup 76 rubs against the housing 84. An unpleasant squeaking noise results. Further, the spring cup, housing and spring 86 are subject to unacceptable wear. Thus, the spring cup, housing and spring may have to be frequently replaced.

SUMMARY OF THE INVENTION

The invention relates to an axle lift mechanism used on a vehicle having a support frame and an axle bearing suspension means supporting the frame and movable between load bearing and non-load bearing relationships with the vehicle. The lift mechanism includes toggle linkage means pivotably coupled to the frame and to the suspension means for movement of the axle between first and second positions, corresponding to the load bearing and non-load bearing positions, respectively. Coil spring biasing means are coupled to the frame and to the toggle linkage means to bias the toggle linkage means to the second position. The coil spring biasing means is mounted in a housing and one end of the coil spring biasing means bears against one end of the housing. The toggle means extends through the coil spring biasing means and is coupled to another end of the coil spring biasing means through a spring cup.

In accordance with the invention, a wear plate is positioned between the spring cup and the housing to avoid wear on the spring cup. The wear plate is preferably made from a lubricating plastic material to reduce noise and wear. The wear plate is preferably removably mounted to the spring cup.

The coil spring preferably is tapered from the one end to the other end so that the spring biasing means avoids contact with the housing along the length thereof during compression of the spring.

BRIEF DESCRIPTION OF THE DRAWINGS

The invention will now be described with respect to the drawings in which.

DETAILED DESCRIPTION OF THE DRAWINGS

Figure 1:
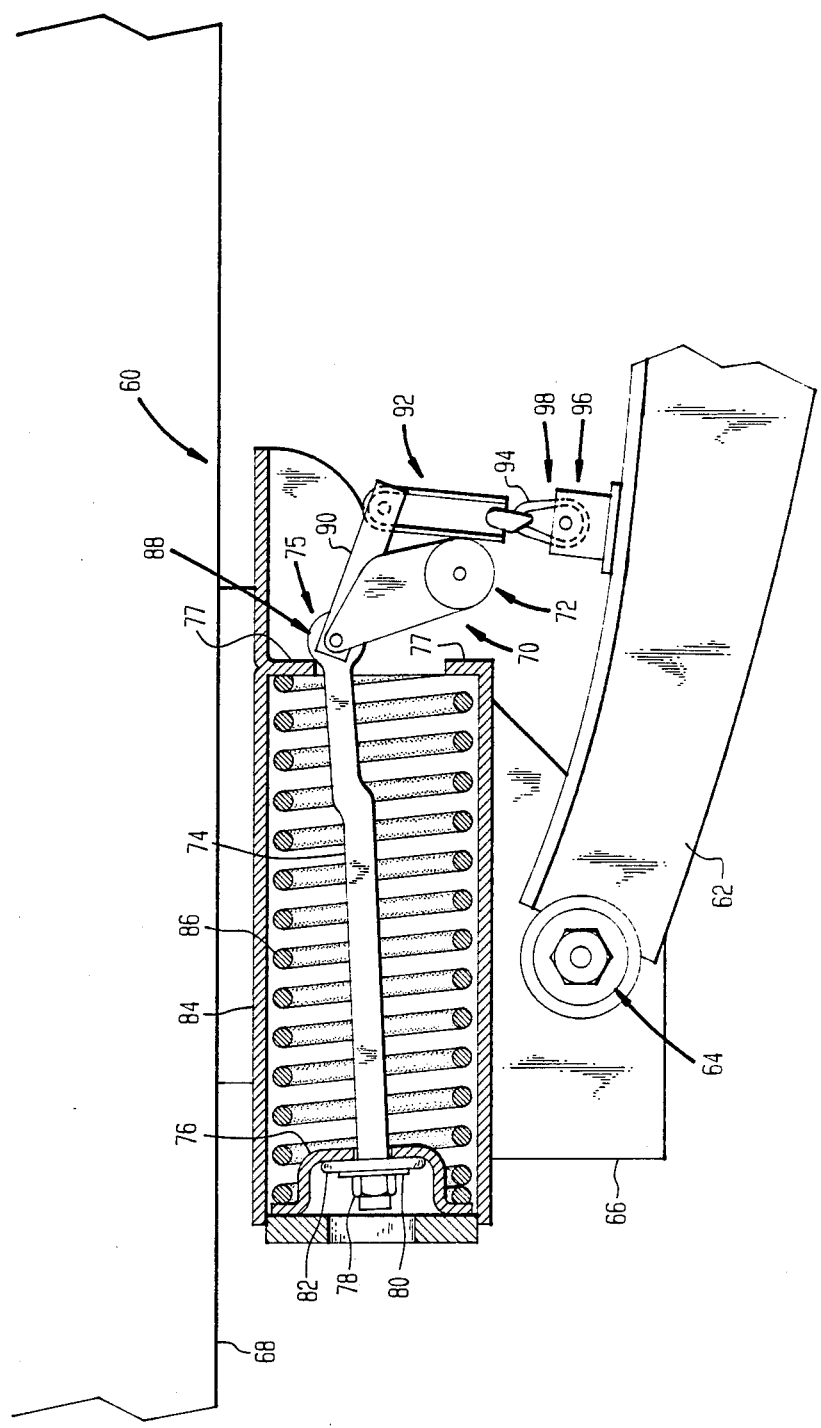
FIG. 1 is a side elevational view in section of a portion of a prior art axle lift mechanism.

FIG. 1 has been described above.

Figure 2:
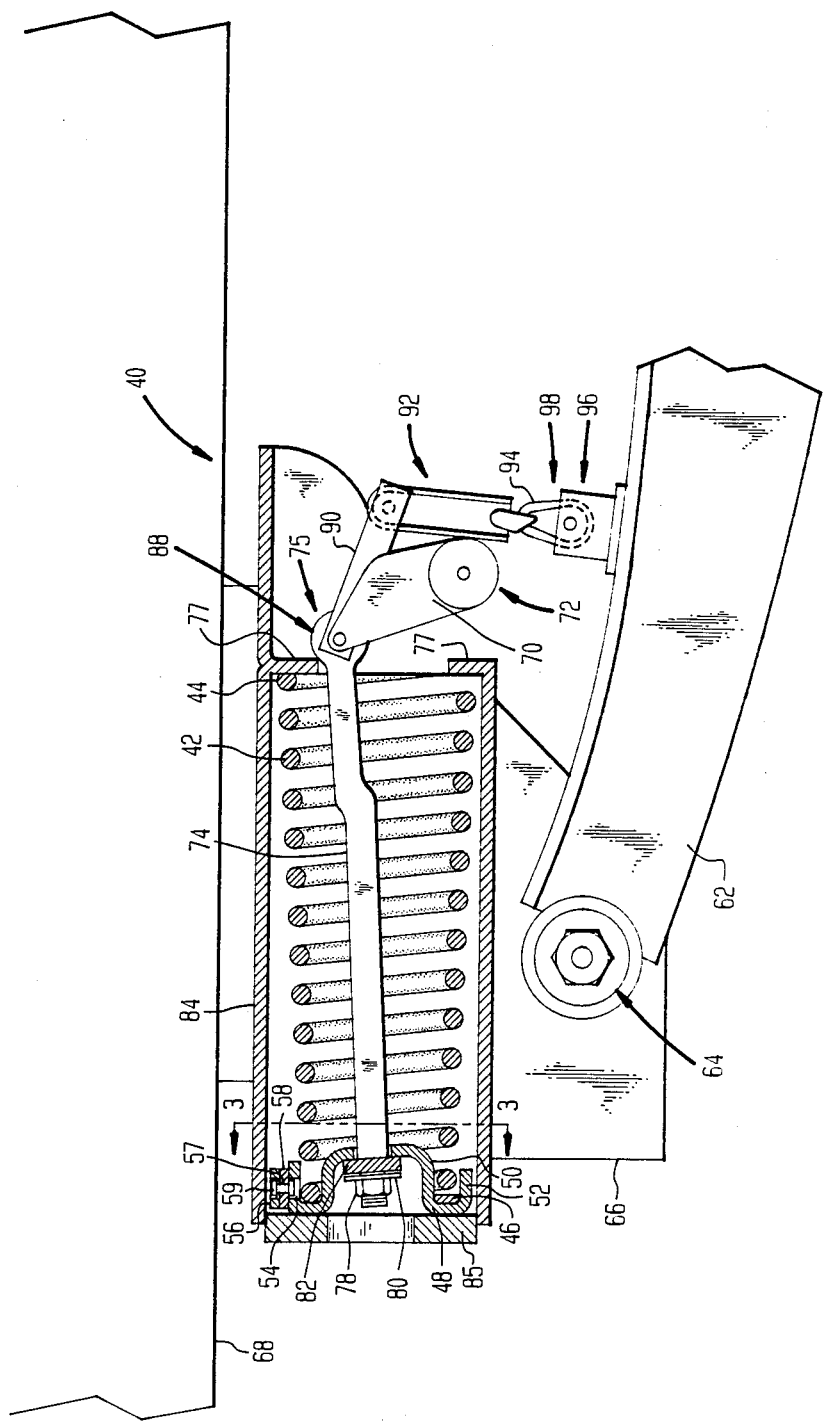
FIG. 2 is a side elevational view in section of an axle lift mechanism according to the invention.
Figure 3:
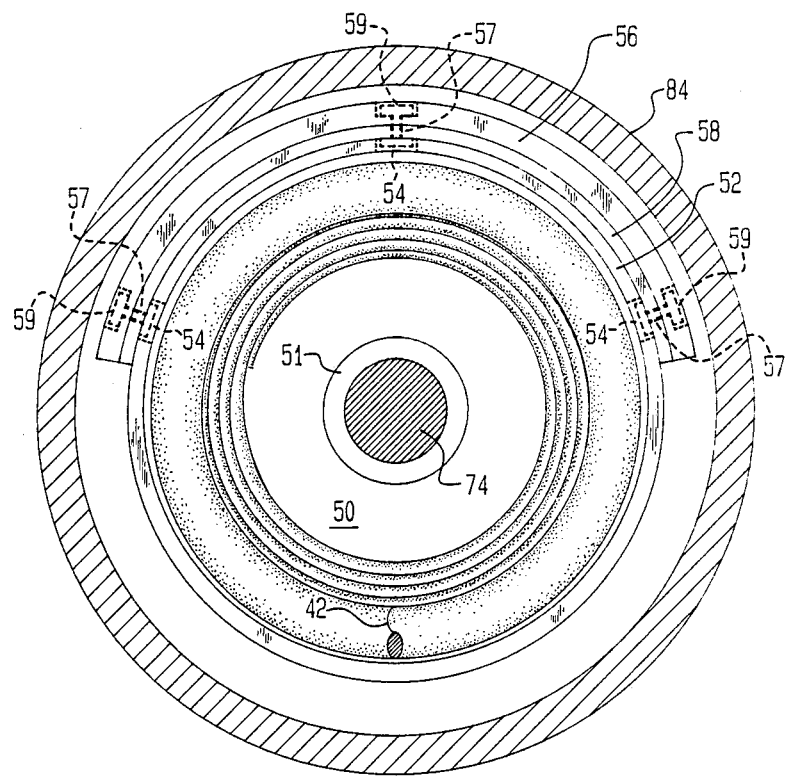
FIG. 3 is a sectional view of the lift mechanism seen in FIG. 2 and taken along lines 3—3 of FIG. 2.

Referring now to the drawings, and to FIGS. 2 and 3 in particular, there is shown a suspension system 40 of the same general nature which has been described above with reference to FIG. 1. In FIGS. 2 and 3, like numerals have been used to designate like parts. The suspension system illustrated in FIGS. 2 and 3 is in all respects similar to the suspension illustrated in FIGS. 1 except that the spring and spring cup are different. For purposes of brevity, the description of the common parts of the suspensions 40 and 60 will not be repeated except as required to describe the different elements.

A compression coil spring 42 is tapered from a back end 44 to a front end 46. The back end 44 abuts the stationary lip 77 of the housing 84 and the front end of the coil spring engages a spring cup 48. The spring cup 48 has an annular recess which is formed between a circular central portion 50 and a circular rearwardly directed flange 52. A central opening 51 is provided through the circular central portion 50 and the forged bar 74 extends through the opening 51. A nut 78 is threaded onto the outer end of the forged bar 74 and retains a washer 80 and a bushing 82 in snug engagement with the circular central portion 50 of the spring cup 48. Three openings 54 are provided in the circular flange 52 of the spring cup 48 in spaced relationship at approximately 60° apart at the top portion thereof. An arcuate wear plate 56 having openings 57 is mounted on the outer portion of the circular flange 52 through a mounting plate 58 which is coextensive therewith. Openings 57 are in registry with the openings 54. Pins 59 extend through openings in the mounting plate 58, through openings 57 in the arcuate wear plate 56 and into the openings 54 in the circular flange 52 in order to mount the wear plate 56 on the circular flange 52. As illustrated in FIG. 3, the wear plate has an arc of about 140° and is centered on the top of the spring cup 46. Typically, the spring cup will rub against the upper portion of the housing. Thus, the wear plate will prevent wear between the spring cup and the housing wall 54. The tapered nature of the spring 42 and the positioning of the wear plate 56 eliminates friction and rubbing between the spring 42 and the housing 84. The wear plate 56 is preferably made from a lubricating plastic material such as a hard polyimide or a polyamide.

The wear plate 56 and the mounting plate 58 are easily removed from the spring cup and can be easily replaced. This replacement can take place by simply removing the spring cup from the end of the forged bar 74. Because of the lubricating and softer nature of the wear plate 56, wear on the inside surfaces of the housing 54 is eliminated. Since the wear plate is of softer material than the housing 84, any wearing will take place on the wear plate rather than on the housing.

In operation, the suspension system is illustrated in FIGS. 2 and 3 in the lift or upper position. In this condition, the wheels in the suspension system will not be in contact with the ground. The air spring (not shown) will be deflated. When it is desired to lower the wheels to contact the ground and partially support the vehicle, the air spring is inflated which drives the trailing arm 62 downwardly about the pivot connection 64. As the trailing arm 62 rotates in a clockwise direction, the lever arm 70 will rotate counterclockwise about the pivot connection 72. Rotation of the lever arm 72 will draw the forged bar 74 to the right as viewed in FIG. 2 to compress the spring 42 against the stationary end 77. Rotation of lever arm 72 will continue until the lever reaches an over-center position and the wheels are in contact with the ground. In this position, the spring will be compressed but will not exert a significant upward force on the trailing arm 62.

When it is desired to raise the arm 62, the air spring is deflated which results in upward movement of the trailing arm 62 through the pressure of spring 42 against the spring cup 48 and the forged bar 74. The rotation of the lever arm 70 will continue until it reaches the position illustrated in FIG. 2, at which point the spring cup 48 will be seated against the end wall 85 of housing 84.

Referring now to FIGS. 4-7, a lift mechanism 100 is adapted for use with load carrying vehicles, such as semi-trailer truck vehicles and the like, for automatically lifting a vehicle axle to a raised position when the vehicle is not heavily loaded. The lift mechanism 100 is also adapted to allow the axle to move from a raised position to a lowered position when the axle is in a load transmitting relationship with the vehicle frame.

Figure 4:
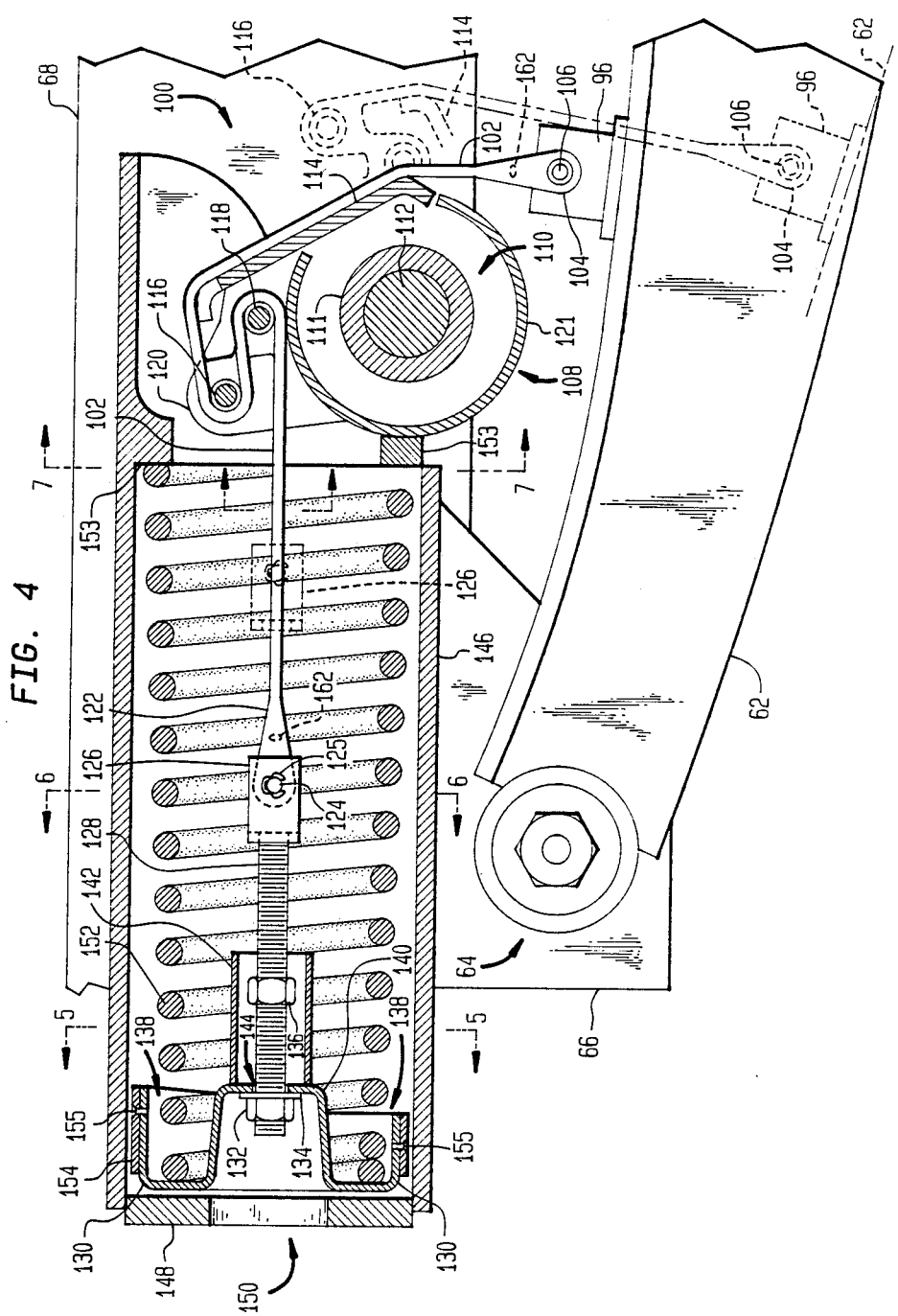
FIG. 4 is a side elevational view in section of a second embodiment of an axle lift mechanism in accordance with the invention.

With like numbered elements corresponding to similar elements of the vehicles and lift mechanisms previously described with respect to FIGS. 1-3, the axle lift mechanism 100 is shown in FIG. 4 in use on a vehicle having a trailing arm 62 pivotably mounted at one end to a vehicle frame bracket 66 through a pivot connection 64. Bracket 66 is, in turn, rigidly secured to a frame 68 of the vehicle. Although not shown in FIG. 4 of the drawings, an axle movable between raised and lowered positions can be conventionally coupled to the trailing arm 62 in a manner similar or comparable to that previously described with respect to FIG. 1. In addition, an air spring (not shown) can be mounted to the opposing end of arm 62 for selectively moving the axle from a raised position to a load transmitting relationship with vehicle frame 68.

Rigidly mounted to the upper surface of trailing arm 62 in a spaced apart relationship from the pivot connection 64 is a conventional anchor 96. The lift mechanism 100 includes a flexible strap 102 having one end 104 flexibly coupled to the anchor 96 through anchor bolt 106 or other comparable connecting means.

Figure 7:
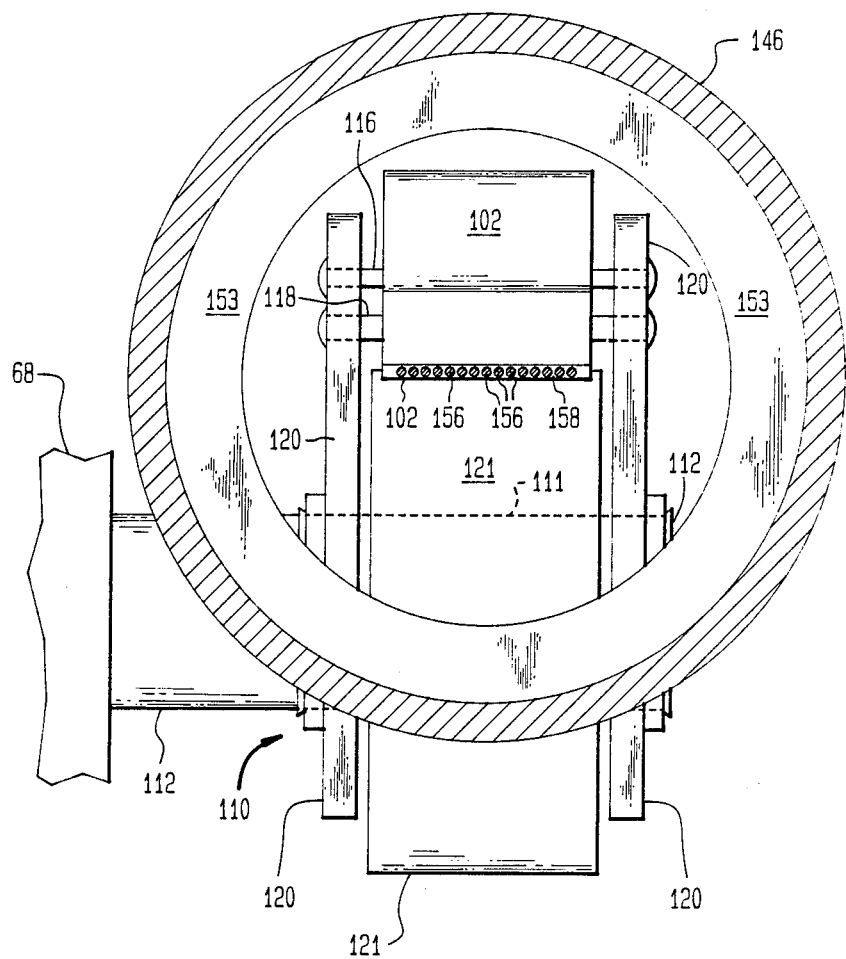
FIG. 7 is a sectional view of the axle life mechanism shown in FIG. 4 taken along lines 7—7 of FIG. 4.

The strap 102 extends upwardly from the anchor 96 and engages a cam 108 as depicted in FIG. 4. Referring to FIGS. 4 and 7, cam 108 is pivotably mounted to the vehicle frame 68 through a pivot connection 110 comprising a pivot tube 111 and rocker shaft 112 coupled to frame 68 and received through tube 110. Bearings or similar means can be employed to provide relatively frictionless movement of shaft 112 relative to tube 111. The tube 111 extends between and is secured to a pair of end supports 120, only one end support 120 being shown on FIG. 4. With the tube 110 rotatably receiving the rocker shaft 112, the tube 110 and interconnected end supports 120 can freely rotate relative to shaft 112.

The cam 108 also includes a curved wrapper 121 welded or otherwise secured to end supports 120 at their lower portion. At the rear portion of cam 108, the side supports 120 curve inwardly and are integrally secured to a tongue portion 114, extending upwardly along the rear of cam 108. With the cam 108 in the position shown in FIG. 4, the flexible strap 102 extends along the tongue 114 and is received on an upper guide shaft 116 transversely mounted between the cam end supports 120. The strap 102 is further threaded around a lower guide shaft 118 also transversely mounted to the end supports 120.

Figure 6:
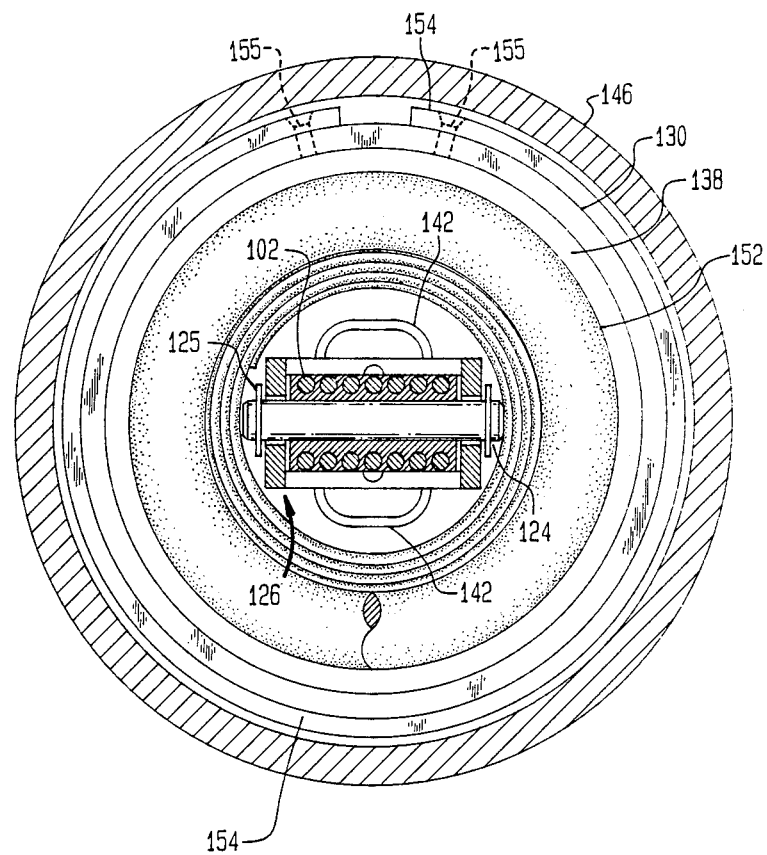
FIG. 6 is a sectional view of the axle lift mechanism shown in FIG. 4 taken along lines 6—6 of FIG. 4.

The flexible strap 102 extends outwardly between the lower guide shaft 118 and cam wrapper 121 into a tubular housing 146 secured by suitable mounting means (not shown) to the vehicle frame 68. As shown in FIGS. 4 and 6, a terminating end 122 of the flexible strap 102 is secured to a clevis 126 through a pin 124 secured to the clevis 126 by means of retaining rings 125.

Figure 5:
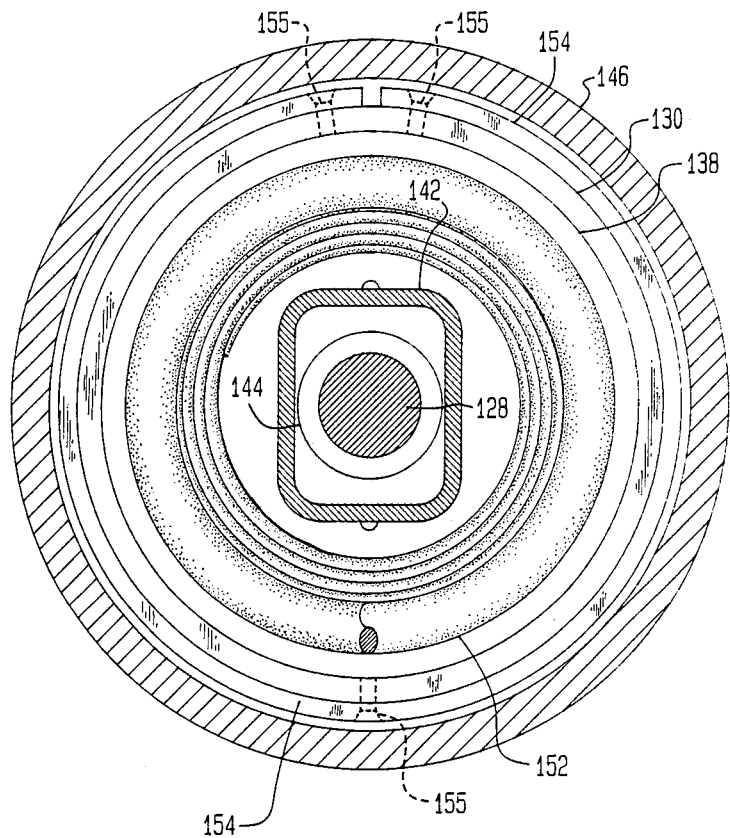
FIG. 5 is a sectional view of the axle lift mechanism shown in FIG. 4 taken along lines 5—5 of FIG. 4.

Extending outwardly from an opposing end of clevis 126 and rigidly welded or otherwise secured thereto in substantially the same plane as strap 102 is a threaded rod or bolt 128. Referring to FIGS. 4 and 5, the bolt 128 is received through an aperture 144 of a spring cup 130. A nut 132 threadably engaged on bolt 128 holds a bushing 134 in an abutting relationship against a surface of spring cup 130.

The spring cup 130 has a substantially round configuration with a peripheral recess 138 and integral central portion 140, the aperture 144 extending through central portion 140. An annular inner rod housing 142 is welded or otherwise secured to the central portion 140, and a portion of the threaded rod 128 axially extends therethrough. A second nut 136 is threadably received (and rigidly attached) on the rod 128 to prevent rotation of threaded rod 128 within housing 142, and prevents twisting of the strap 102 during adjustment of the coil spring 152 subsequently described herein.

The end of the tubular housing 146 adjacent spring cup 130 can be enclosed by an end cover 148 or similar means, with an opening 150 centrally positioned therein. Opening 150 allows for adjustment of nut 132 on threaded rod 128, so as to allow biasing of the position of rod 128 relative to spring cup 130 without any substantial disassembly of lift mechanism 100.

Bearing against the spring cup 130 within recess 138 is one end of a tapered coil spring 152 as shown in FIG. 4. The coil spring 152 extends longitudinally through the housing 146, with the threaded rod 128, clevis 126 and interconnected strap 102 located along the axis of spring 152. The opposing end of spring 152 bears against an inner housing lip 153. The coil spring 152 tapers outwardly from the spring cup 130 to the housing lip 153. Mounted to the spring cup 130 intermediate the outer cylindrical surface of cup 130 and the inner surface of tubular housing 146 is an annular wear plate 154. Screws 155 mount the wear plate 154 to the spring cup 130. The wear plate 154 maintains a spaced, lubricated relationship between the spring cup 130 and tubular housing 146. The wear plate 154 can be made from a hard lubricating plastic material such as a polyimide or polyamide resin and reduces noise and wear between the spring cup and the housing 146.

Referring to FIG. 7, the flexible strap 102 can preferably include a set of spaced apart cords 156 formed from material such as that commercially sold by duPont Corporation under the trademark KEVLAR, or other suitable cable and like articles. The cords 156 are encased in flexible polyurethane 158 or other material suitable for holding the cords 156 in place, by means such as molding the cords 156 within the polyurethane.

The operation of the axle lift mechanism 100 will now be described with respect to FIGS. 4-7.

When the axle is in the raised position, elements of lift mechanism 100 will have the relative configurations shown in solid-line format in FIG. 4. When the axle is in the lowered position, the trailing arm 62, anchor 96, cam 108 and clevis 126 will have the relative configurations shown in dotted-line format in FIG. 4.

When the axle is in the lowered position, and it is desired to lift the axle to the raised position, air pressure in the air spring can be decreased so as to relieve vehicle load from the trailing arm 62. When the vehicle load is relieved, the only forces exerted downwardly on the flexible strap 102 through anchor 96 will be the weight of the trailing arm 62 and axle. Lifting forces will be exerted on the trailing arm 62 by compression spring 152 acting through strap 102. That is, spring 152, being in a loaded state, will exert forces on the spring cup 130 so as to move the spring cup 130 toward the position adjacent end cover 148 as shown in FIG. 4. In turn, spring cup 130 will exert pulling forces on threaded rod 128 through the central portion 140 bearing against bushing 134.

With threaded rod 128 connected to flexible strap 102 through clevis 126, corresponding forces are exerted on the flexible strap 102. With the cam 108 pivotable through rocker shaft 112, and the flexible strap 102 wound around guide shafts 116 and 118, the cam 108 will be rotated in a counterclockwise direction as viewed in FIG. 4. Rotation of cam 108 will exert lifting forces on trailing arm 62 through strap 102 and anchor 96. As the cam 108 rotates towards the raised position, the length of flexible strap 102 bearing against tongue 114 will increase, while the length of strap 102 bearing against wrapper 121 will decrease. The cam 108 therefore acts as a lever to translate linear forces exerted on flexible strap 102 through rod 128 to upward lifting forces at the connection of flexible strap 102 to trailing arm 62. Accordingly, the trailing arm 62 and interconnected wheel/axle assembly (not shown) are lifted toward a raised position so that the wheels are disengaged from a ground surface.

It should be noted that the threaded rod 128 maintains a substantially coaxial relationship to the spring cup 130 and spring 152. Furthermore, lines of force exerted through the portion of flexible strap 102 interconnecting rod 128 and cam 108 remain parallel to rod 128 during lifting of the axle. Accordingly, the vector sum of the forces exerted on spring cup 130 is coaxial with rod 128 and parallel to force lines through strap 102. By maintaining this relationship, frictional forces between the spring cup 130 and the tubular housing 146, and between spring cup 130, spring 152 and rod 128 are minimized relative to frictional forces exhibited in other types of lift mechanisms. In addition, the lift mechanism 100 provides a relatively uniform lifting force change rate on the axle throughout movement between the lowered and raised axle positions.

When it is desired to transmit vehicle load to the wheel/axle assembly, the previously described air spring assembly can be inflated so as to exert downward forces on the end of trailing arm 62 opposing the pivot connection 64. With the downwardly exerted forces exerted on trailing arm 62 sufficient to overcome the lifting forces exerted by the coil spring 152 through flexible strap 102, the cam 108 will rotate through rocker shaft 112 in a clockwise direction as viewed in FIG. 4. As the cam 108 rotates, the length of flexible strap 102 bearing against tongue 114 will decrease. Correspondingly, however, an increasing portion of the flexible strap 102 between clevis 126 and lower guideshaft 118 will bear against the cam wrapper portion 121. With the cam 108 rotating in a clockwise direction, forces are exerted on threaded rod 128 through clevis 126 and flexible strap 102. These forces are correspondingly exerted on spring cup 130 through bushing 134 in a direction opposing forces exerted by tapered coil spring 152. Accordingly, clevis 126, threaded rod 128 and spring cup 130 will move to the right as viewed in FIG. 4.

As the spring cup 130 moves toward the cam 108, the tapered coil spring 152 is increasingly loaded and exerts increasing forces against spring cup 130 opposing movement. As the cam 108 rotates, the lifting forces provided by the lever arm advantage of the cam 108 relative to the rod 128 connection decrease. However, with the tapered coil spring 152 being increasingly tensioned as the cam 108 rotates, the opposing forces exerted on rod 128 through spring cup 130 will correspondingly increase. Accordingly, the lifting forces exerted on trailing arm 62 as the cam 108 rotates either clockwise or from its raised position, or counterclockwise from a lowered position, change at a substantially uniform rate.

By maintaining the forces acting through rod 128 substantially coaxial relative to spring cup 130 and spring 152, relative friction between cup 130, tapered coil spring 152 and tubular housing 146 is minimized. Tapering of the coil spring 152, in addition to the arrangement of cam 108, flexible strap 102 and threaded rod 128, provides for a relatively higher and more uniform lifting force on trailing arm 62.

In addition, the flexible strap 102, constructed of KEVLAR cords or other suitable material and providing a linkage between threaded rod 128 and trailing arm 62, has a relatively high tensile strength. Furthermore, the strap 102 has a relatively minimum tendency to stretch and provides good abrasion resistance.

Reasonable modification and variations of the above-described illustrative embodiments of the invention are possible without departing from the spirit and scope of the invention which is defined in the appended claims.

The embodiments of the invention in which an exclusive property or privilege is claimed are defined as follows:

1. In an axle lift mechanism for use in a vehicle having a support frame and an axle-bearing suspension means supporting the frame and movable between load-bearing and nonload-bearing relationships with the vehicle, wherein the lift mechanism comprises:
   toggle linkage means adapted to be pivotably coupled to the frame and to the suspension means for movement of the axle between first and second positions corresponding to load-bearing and nonload-bearing positions, respectively;
   a spring housing adapted to be mounted to the frame and having a spring retainer at one end thereof;
   a spring cup having a spring-receiving means and mounted in another end of said housing;
   a coil spring biasing means mounted in said housing, one end of said coil spring biasing means bearing against said housing spring retainer and another end of said coil spring biasing means being received in said spring cup spring-receiving means; and
   said toggle linkage means extends in part through said coil spring biasing means and is coupled to said spring cup whereby said coil spring biasing means biases said toggle linkage means to said second position;
   the improvement which comprises:
   a wear plate positioned between said spring cup and said housing to avoid wear on the spring cup.

2. An axle lift mechanism according to claim 1 wherein said wear plate is made of a lubricating plastic material to reduce noise and friction.

3. An axle lift mechanism according to claim 2 wherein said lubricating plastic material is a solid polyamide or a polyimide resin.

4. An axle lift mechanism according to claim 2 wherein said wear plate is removably mounted to said spring cup for ease of replacement.

5. An axle lift mechanism according to claim 4 wherein said wear plate extends around the upper portion of said spring cup only.

6. An axle lift mechanism according to claim 5 wherein said toggle mechanism comprises a rigid rod.

7. An axle lift mechanism according to claim 6 wherein said spring biasing means is tapered between said one end and said another end.

8. An axle lift mechanism according to claim 2 wherein said toggle means includes a flexible strap which is positioned coaxially in said coil spring biasing means.

9. An axle lift mechanism according to claim 8 wherein said coil spring biasing means is tapered between said one end and said another end.

10. An axle lift mechanism according to claim 2 wherein said coil spring biasing means is tapered between said one end and said another end.

11. An axle lift mechanism according to claim 1 wherein said wear plate is removably mounted to said spring cup for ease of replacement.

12. An axle lift mechanism according to claim 1 wherein said wear plate extends around an upper portion of said spring cup only.

13. An axle lift mechanism according to claim 12 wherein said toggle means comprises a flexible strap which is positioned coaxially within said coil spring biasing means.

14. An axle lift mechanism according to claim 1 wherein said coil spring biasing means is tapered between said one end and said another end.

15. An axle lift mechanism according to claim 14 wherein said toggle means includes a flexible strap which is positioned coaxially within said coil spring biasing means.

16. A toggle lift mechanism according to claim 1 wherein said toggle mechanism is a flexible strap which is positioned coaxially within said coil spring biasing means.

17. An axle lift mechanism according to claim 1 wherein said toggle mechanism comprises a rigid rod.

* * * * *